G. A. SHORES.
HOG OILING DEVICE.
APPLICATION FILED JAN. 22, 1917.

1,221,484.

Patented Apr. 3, 1917.

Inventor,
George A. Shores, by
G. C. Kennedy,
Attorney.

UNITED STATES PATENT OFFICE.

GEORGE A. SHORES, OF CEDAR RAPIDS, IOWA, ASSIGNOR TO SHORES-MUELLER COMPANY, OF CEDAR RAPIDS, IOWA.

HOG-OILING DEVICE.

1,221,484. Specification of Letters Patent. Patented Apr. 3, 1917.

Application filed January 22, 1917. Serial No. 143,704.

*To all whom it may concern:*

Be it known that I, GEORGE A. SHORES, a citizen of the United States of America, and a resident of Cedar Rapids, Linn county, Iowa, have invented certain new and useful Improvements in Hog-Oiling Devices, of which the following is a specification.

My invention relates to improvements in hog oiling devices, and the object of my improvement is to supply an apparatus having a movable applicator of a medicament or medicative lubricant to a hog or other animal, adapted to spread the medicative substance or liquid upon the animal when put in motion by the rubbing contact of the animal itself.

Figure 1:
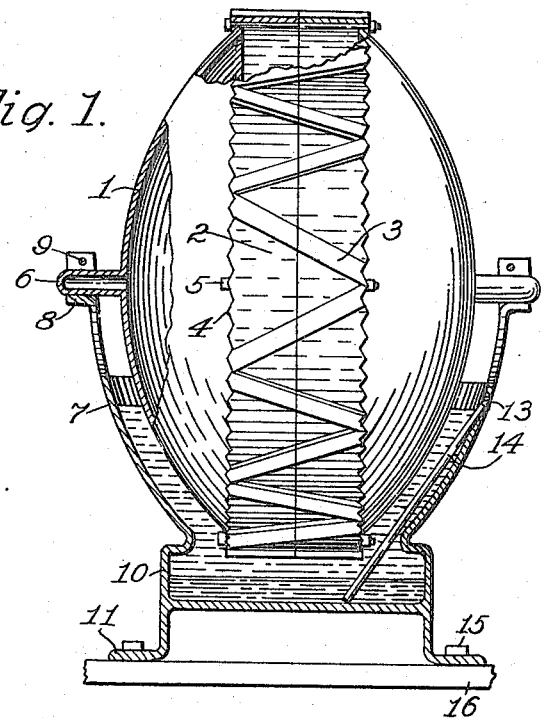
Figure 2:
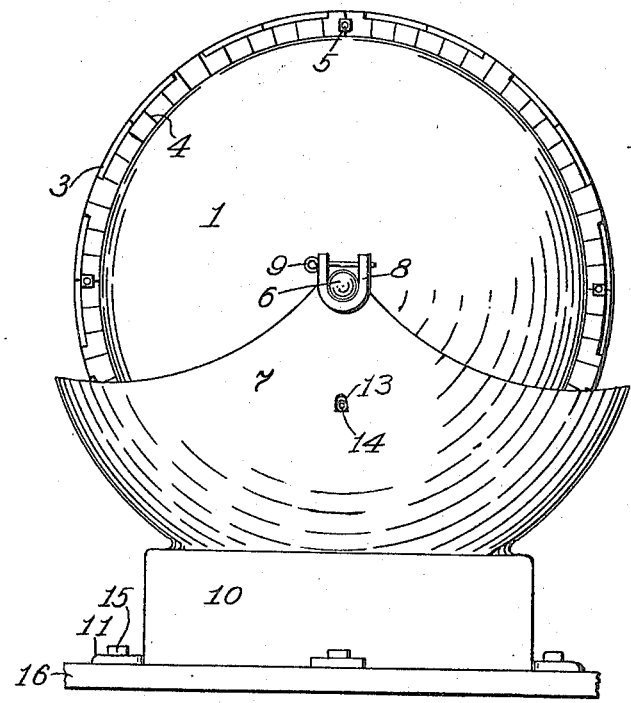

This object I have accomplished by the means which are hereinafter described and claimed, and which are illustrated in the accompanying drawings, in which Figure 1 is an elevation of my improved hog oiling device, with parts sectioned or broken away to thereby better disclose the interior construction, and Fig. 2 is an elevation of said device taken at a right angle from that shown in said Fig. 1.

Similar numerals of reference denote corresponding parts throughout the several views.

The numeral 10 denotes an open top tank having legs 11 secured by screws 15 to a base-block 16. The upper part 7 is expanded into a bowl-like shape and has oppositely-located open-top trunnion-bearings 8.

A rotatable lubricant applicator is positioned above said tank and partly within its upper expanded part 7. This applicator consists of like halves 1 of a hollow oblate spheroid, provided with integral trunnions 6 which are rotatably mounted in the bearings 8 removably, and retained therein by means of pins 9 passed through alined orifices in parts of the bearing projecting above the trunnions.

The tank 10 may be filled with medicative oil or any other desired liquid medicament, but when oil is used, and in case water enters the tank, I have provided means for evacuating the water from beneath the oil. This means consists of a tube 14 passed through an opening 13 in the upper part of the tank-part 7 downwardly into the tank 10 and nearly to the bottom thereof. The weight of oil in said tank will force out the water beneath through said tube.

The applicator is of the form of an oblate spheroid. It may have an equatorial annular raised cylindrical part 2, and this part may have thereon raised ribs 3, which may be zig-zag as shown, or otherwise formed, and relatively arranged. The outer edges of this cylindrical part 2 may be radially dentated as at 4.

When an animal rubs itself against said applicator, the latter is rotated, and since the cylindrical part 2, as well as a portion of the spheroid 1, dips within the liquid in said tank, the ribs 3 elevate a portion of the liquid which flows to and is carried through the dentations 4 to the surface of the spheroid, and thus first spread superficially thereon to then lubricate the contacting parts of the animal. The dentations spread the fluid, distributing evenly upon the spheroid, while they also, with the projecting ribs 3, afford rugations or scratching places upon which the animal may find relief when rubbing itching parts against them.

The flattened curves of the surface of the oblate spheroid are best calculated to afford clearance adjacent to the rubbing part 2, so that the animal may rub against the part 2 angularly to employ the dentations 4 in scratching while getting a large extent of skin in contact with the smooth spheroidal periphery to quickly apply the medicament.

Since the trunnions 6 are easily lifted from their bearings when the pins 9 are removed, the applicator 1 may be quickly separated from the tank when it is desired to clean the latter.

Having described my invention, what I claim as new, and desire to secure by Letters Patent, is:

1. In a device of the character described, in combination, an open-top tank, and a rotatable body supported to partially dip therein, said body being in the form of an oblate spheroid having a raised circumferential annulus thereon.

2. In a device of the character described, in combination, an open-top tank, and a rotatable body supported to partially dip therein, said body being in the form of an oblate spheroid having a raised rugated circumferential annulus thereon.

Signed at Waterloo, Ia. this 6th day of Jan. 1917.

GEORGE A. SHORES.

Witnesses:
 PEARL STANTON,
 G. C. KENNEDY.

Copies of this patent may be obtained for five cents each, by addressing the "Commissioner of Patents, Washington, D. C."